(12) United States Patent
Rangwala

(10) Patent No.: US 9,889,847 B2
(45) Date of Patent: Feb. 13, 2018

(54) METHOD AND SYSTEM FOR DRIVER ASSISTANCE FOR A VEHICLE

(71) Applicant: VOLVO TRUCK CORPORATION, Göteborg (SE)

(72) Inventor: Murtaza Rangwala, Bangalore (IN)

(73) Assignee: Volvo Truck Corporation, Göteborg (SE)

( * ) Notice: Subject to any disclaimer, the term of this patent is extended or adjusted under 35 U.S.C. 154(b) by 48 days.

(21) Appl. No.: 15/106,202

(22) PCT Filed: Nov. 27, 2014

(86) PCT No.: PCT/EP2014/003172
§ 371 (c)(1),
(2) Date: Jun. 17, 2016

(87) PCT Pub. No.: WO2015/096878
PCT Pub. Date: Jul. 2, 2015

(65) Prior Publication Data
US 2016/0318511 A1    Nov. 3, 2016

(30) Foreign Application Priority Data

Dec. 24, 2013 (IN) .......................... 6062/CHE/2013

(51) Int. Cl.
*G06F 7/00* (2006.01)
*B60W 30/095* (2012.01)
(Continued)

(52) U.S. Cl.
CPC ......... *B60W 30/0953* (2013.01); *B60Q 1/525* (2013.01); *B60Q 9/008* (2013.01);
(Continued)

(58) Field of Classification Search
CPC .. B60W 30/0953; B60W 10/04; B60W 10/20; B60W 30/18163; B60W 30/095;
(Continued)

(56) References Cited

U.S. PATENT DOCUMENTS

2011/0082613 A1*  4/2011  Oetiker ................. B60W 10/20
                                                         701/25
2011/0106361 A1*  5/2011  Staempfle .......... B62D 15/0265
                                                         701/23
(Continued)

FOREIGN PATENT DOCUMENTS

CN          1502502 A       6/2004
DE     102011086299 A1       5/2013
(Continued)

OTHER PUBLICATIONS

International Search Report (dated Mar. 5, 2015) for corresponding International App. PCT/EP2014/003172.
(Continued)

*Primary Examiner* — Ian Jen
(74) *Attorney, Agent, or Firm* — WRB-IP LLP

(57) ABSTRACT

A method for driver assistance for a first vehicle includes monitoring, using a detection arrangement provided with the first vehicle, a predefined area surrounding the first vehicle, identifying a road condition ahead of the first vehicle and within the predefined area, the road condition fulfilling a predetermined risk criteria, identifying a second vehicle initiating a maneuver for overtaking the first vehicle, and determining a collision risk level for the first and/or second vehicle during the overtaking maneuver.

17 Claims, 6 Drawing Sheets

(51) Int. Cl.
    B60W 50/14    (2012.01)
    B60Q 1/52     (2006.01)
    B60W 30/09    (2012.01)
    G08G 1/16     (2006.01)
    B60W 30/18    (2012.01)
    B60Q 9/00     (2006.01)
    B60W 10/04    (2006.01)
    B60W 10/20    (2006.01)

(52) U.S. Cl.
    CPC .......... *B60W 10/04* (2013.01); *B60W 10/20* (2013.01); *B60W 30/09* (2013.01); *B60W 30/095* (2013.01); *B60W 30/18163* (2013.01); *B60W 50/14* (2013.01); *G08G 1/162* (2013.01); *G08G 1/167* (2013.01); *B60W 2550/10* (2013.01); *B60W 2550/14* (2013.01); *B60W 2550/146* (2013.01); *B60W 2550/302* (2013.01); *B60W 2550/408* (2013.01); *B60W 2710/20* (2013.01); *B60W 2720/10* (2013.01); *B60W 2750/40* (2013.01)

(58) Field of Classification Search
    CPC ............. B60W 50/14; B60W 30/09; B60W 2550/302; B60W 2720/10; B60W 2710/20; B60Q 9/008; B60Q 1/525; G08G 1/162; G08G 1/167
    See application file for complete search history.

(56)            References Cited

U.S. PATENT DOCUMENTS

2012/0083947 A1*  4/2012  Anderson ............ B60W 30/09
                                                       701/3
2012/0303222 A1* 11/2012  Cooprider ........... B60W 10/06
                                                       701/48

FOREIGN PATENT DOCUMENTS

DE      102012011994 A1    12/2013
EP         2423902 A1       2/2012
EP         2620931 A1       7/2013
WO       2013187835 A       6/2013

OTHER PUBLICATIONS

International Preliminary Report on Patentability (dated Apr. 1, 2015) for corresponding International App. PCT/EP2014/003172.

* cited by examiner

METHOD AND SYSTEM FOR DRIVER ASSISTANCE FOR A VEHICLE

BACKGROUND AND SUMMARY

The present invention generally relates to a method for driver assistance for a vehicle. The invention also relates to a corresponding driver assistance system and a computer program product.

Recent advances in assisting a driver operating a vehicle have successfully emerged into the market as they compensate shortcomings of human drivers, such as inevitable reaction times for emergency brakes or deficiencies for vehicle stabilization.

Systems providing such a drive assistance may typically be installed with the vehicle and comprise a suitable sensor arrangement (e.g. including radar, lidar, image processing) or the evaluation of vehicle-to-vehicle communication for detecting the vehicle environment and determine possible collision objects. Such a system may additionally be connected to the break arrangement of the vehicle and thus be capable of completely preventing an imminent collision or at least minimizing the consequences of a collision by an autonomously initiated full brake application.

Typical implementations of the above discussed functionality may for example find its way into automatic cruise control systems (ACC system), where the ACC system allows adaptability in regards to a preceding second vehicle such that the vehicle-to-vehicle distance is kept long enough to minimize a collision. In some instances, the ACC system may also take into account a further (e.g. third) vehicle placing itself in between the own vehicle and the second vehicle, possibly making it necessary to (emergency) break the own vehicle.

Even though the above discussed implementations for driver assistance minimizes the risk for the own vehicle being part of a collision, vehicles in general are poorly equipped to automatically handle these instances. Accordingly, it would be desirable to introduce a holistic approach where the overall traffic situation is taken into account for reduce the overall risk of collisions, also for vehicles not explicitly equipped with systems for driver assistance.

According to an aspect of the invention, the above is at least partly alleviated by a method for driver assistance for a first vehicle, the method comprising the steps of monitoring, using a detection arrangement provided with the first vehicle, a predefined area surrounding the first vehicle, identifying a road condition ahead of the first vehicle and within the predefined area, the road condition fulfilling a predetermined risk criteria, identifying a second vehicle initiating a maneuver for overtaking the first vehicle, and determining a collision risk level for the first and/or second vehicle during the overtaking maneuver.

In accordance to the invention, the surroundings of the first vehicle is typically automatically monitored, for identifying one or a plurality of risky road conditions ahead of the first vehicle as well as for identifying surrounding vehicles. By means of the invention, if it is identified that a surrounding vehicle (i.e. a second vehicle) is in the process of initiating an overtaking maneuver, such an initiated condition will be taken into account and correlated with the one or plurality of identified risky road conditions. The correlation between these two parameters, i.e. the risky road condition(s) and the just initiated overtaking maneuver by the second vehicle will be used to determine collision risk level for the first and/or second vehicle at the time during which the second vehicle in fact is performing the overtaking maneuver.

Accordingly, the act of the second vehicle in initiating the overtaking maneuver will spark a risk assessment of the overall traffic situation, resulting in the determination of a current risk level for the vehicles involved, i.e. the first and the second vehicle (and possibly further surrounding vehicles). The determined collision risk level may consequently be used for warning the first and/or the second vehicle of the risky situation, or alternatively for requesting the first and/or the second vehicle to modify its driving behavior. In both these cases, the general purpose is to use the detection arrangement provided with the first vehicle to influence the operation of at least one of the first vehicle (e.g. being the first/own vehicle) and the second vehicle (i.e. a surrounding vehicle coming from behind of the first vehicle, travelling in the same direction as the first vehicle and in the process of initiating the overtaking maneuver) such that the overall risk of collisions is reduced and the overall traffic situation is improved. The intention of the invention is accordingly to improve the overall traffic situation not only for the own vehicle but also for vehicles in the surrounding of the own vehicle.

The warning to the second vehicle may for example be provided as a visual, acoustic or haptic warning signal, whereas the modification of the driving behavior may include adjusting at least one of a speed and/or a lateral position of the first and/or the second vehicle.

Communication between the first and the second vehicle for providing instructions and/or warnings may be in any form, typically based on radio or optical communication (e.g. vehicle-to-vehicle communication). In case of requesting a modified driving behavior of the first and the second vehicle, such a request may for example be communicated to a control arrangement for operating the first and/or the second vehicle, for example for the purpose of activating the break arrangement of the first and/or the second vehicle.

In an embodiment of the invention, the step of identifying the road condition ahead of the first vehicle comprises the step of identifying an obstacle ahead of the first vehicle. Such an obstacle may for example be a fixed obstacle, such as a road condition where the road traveled by the first and second vehicle is adjusted from two to one lane (2-to-1 roads). However, the obstacle may alternatively be "non-static", for example being a further (third) vehicle travelling in another lane and in e.g. the opposite direction as compared to the first and the second vehicle. In a similar manner as above, the instructions/warning signal may also be provided to the further (third) vehicle.

Possibly, the third vehicle may also be a "slow" third vehicle travelling in the same direction but in a different lane as compared to the first and the second vehicle, such as for example in case of a traffic congestion being the reason of the third vehicle slowing down. As such, the above mentioned predetermined risk criteria may for example include comparing an identified type of obstacle with a list of situations where an increased risk has been predetermined. Accordingly, in such an embodiment it may additionally be desirable to determine a distance and relative speed between the first vehicle and the obstacle, determine a distance and relative speed between a second vehicle and the obstacle, and calculate, based on the determined distances and speeds of the first and second vehicles in relation to the obstacle, the collision risk level for the first and/or the second vehicle.

In another embodiment of the invention, the step of monitoring the predefined area surrounding the first vehicle may comprise the step of determining road geometry data for a predetermined area surrounding the first vehicle. Such information may for example be used in relation to identifying road conditions fulfilling the predetermined criteria. That is, the identified road condition may not necessarily only include fixed or "non-static" obstacle, but may also include conditions such as listed road work, hills/crests, curves/corners, etc.

The road geometry data may in an embodiment be taken into account for calculating a possible travel trajectory for the second vehicle based on at least one of a position and speed of the second vehicle, and correlating the road geometry data and the possible travel trajectories for the second vehicle for determining if the possible travel trajectory has a collision risk level being above a predetermined threshold. The determination of the possible travel trajectory for the second vehicle will be further discussed below in relation to the detailed description of the invention.

According to another aspect of the present invention there is provided a driver assistance system for a first vehicle, the driver assistance system comprising a detection arrangement provided with the first vehicle and configured for monitoring a predefined area surrounding the first vehicle, and a control unit connected to the detection arrangement and adapted to receive a detection signal from the detection arrangement, the control unit configured to identify a road condition ahead of the first vehicle and within the predefined area, the road condition fulfilling a predetermined risk criteria, detect a second vehicle travelling in the same direction as the first vehicle, wherein the control unit is further configured to identify, based on the detected second vehicle travelling in the same direction as the first vehicle, a maneuver initiated by the second vehicle for overtaking the first vehicle; and determine a collision risk level for the first and/or second vehicle during the overtaking maneuver. This aspect of the invention provides similar advantages as discussed above in relation to the previous aspect of the invention.

According to a still further aspect of the present invention there is provided a computer program product comprising a computer readable medium having stored thereon computer program means for controlling a driver assistance system for a first vehicle, the driver assistance system comprising a detection arrangement provided with the first vehicle and configured for monitoring a predefined area surrounding the first vehicle, and a control unit, wherein the computer program product comprises code for monitoring a predefined area surrounding the first vehicle, code for identifying a road condition ahead of the first vehicle and within the predefined area, the road condition fulfilling a predetermined risk criteria, code for identifying a second vehicle initiating a maneuver for overtaking the first vehicle; and code for determining a collision risk level for the first and/or second vehicle during the overtaking maneuver. Also this aspect of the invention provides similar advantages as discussed above in relation to the previous aspects of the invention.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1A:
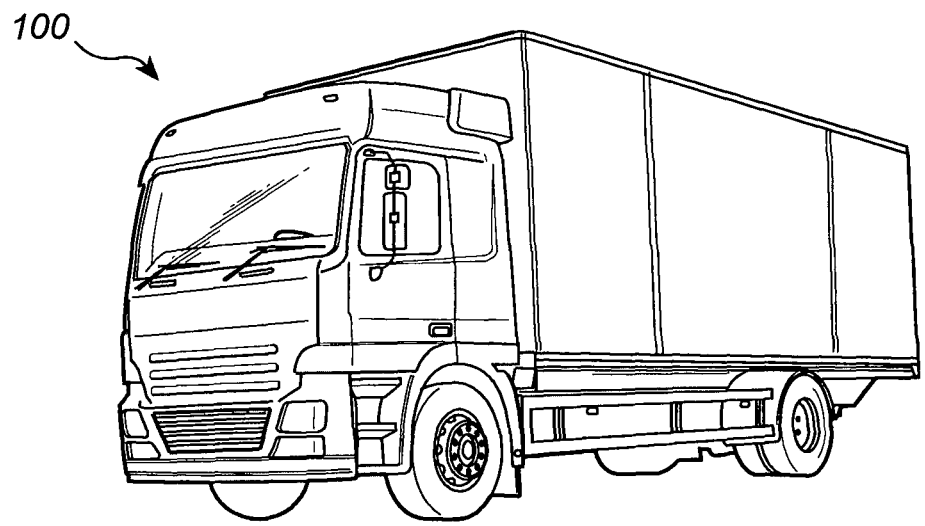
FIG. 1 illustrates a vehicle equipped with a driver assistance system according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1B:
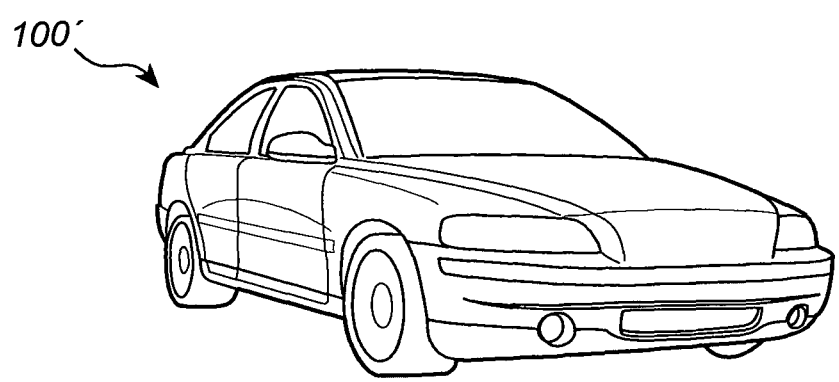
Figure 2A:
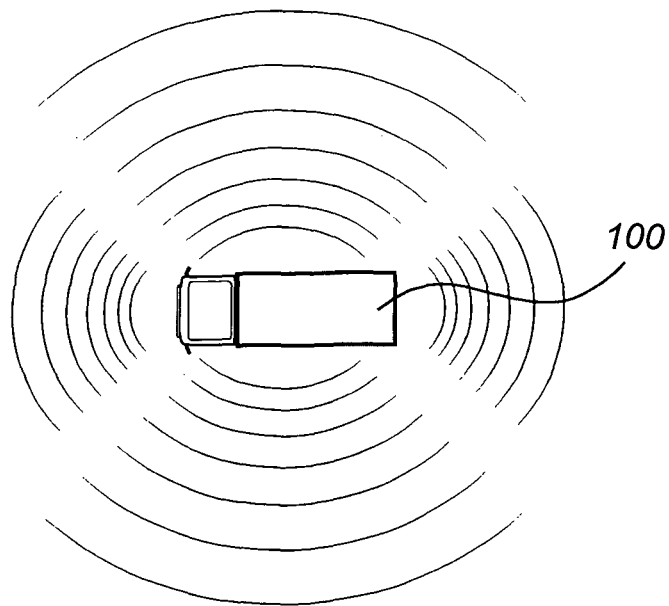
FIG. 2A shows an exemplary vehicle configured for monitoring its surrounding, and FIG. 2B provides an exemplification of the components of a driver assistance system.
Figure 2B:
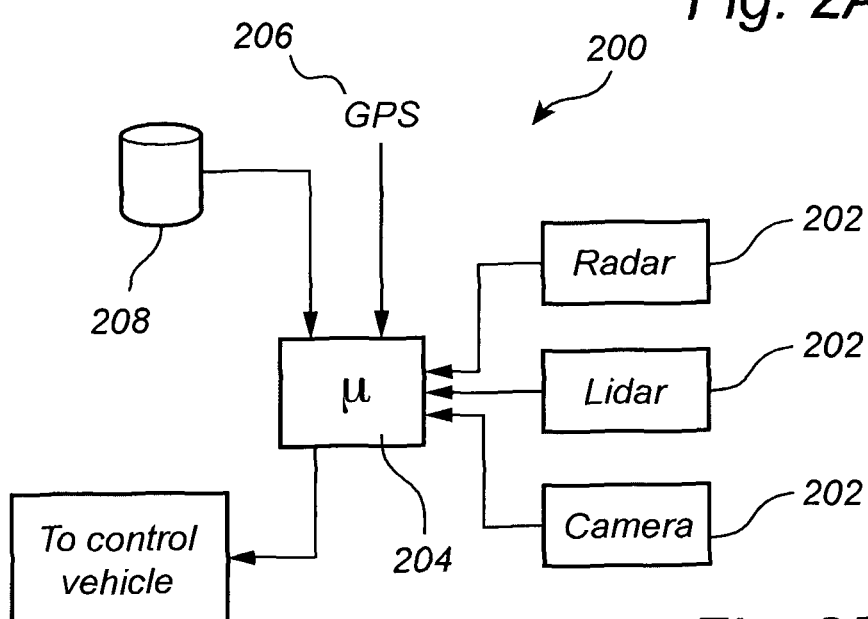

Referring now to the drawings and to FIGS. 1 and 2 in particular, there is in FIG. 1 A depicted an exemplary vehicle, here illustrated as a truck 100, in which a system 200 according to the present invention may be incorporated. The system 200 may of course be implemented, possibly in a slightly different way, in a car 100', as shown in FIG. 1B.

The truck 100 is provided with external sensors 202 arranged to detect the surrounding environment of the vehicle, e.g. lane markings, road marks, road curves, surrounding vehicles, etc. The external sensors 202 may be e.g. cameras, radar or lidar sensors. Preferably, a combination of camera and radar/lidar sensors may be used, since the camera provides a high precision when determining the height and width of an object, whereas a radar sensor provides a high precision when determining the distance to the object. Hereby, size, position, speed, etc. of the surrounding object can be determined.

Typically, the sensors 202 are configured to monitor the surrounding in all directions, preferably front, back, and the two sides of the truck 100. The sensors 202 are preferably connected to a control unit 204 for processing the signals provided by the sensors 202. The control unit 204 may include a general purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The control unit 204 may also be connected to e.g. a communication interface (such as e.g. a CAN bus or similar, or a dedicated communication interface) of the truck 100, preferably for allowing control of elements of the truck, such as for example to control the steering and/or for controlling a break arrangement of the truck 100. Accordingly, from a determination made by the control unit 204 based on data provided by the sensors 202, it may be possible to control the operation of the truck 100, including for example allowing the direction (control the steering) and/or speed (control the break arrangement) of the truck 100 to be adjusted.

Further components may be connected to the control unit 204, including for example arrangements for determination of the position of the truck 100, such as for example a GPS 206 (global positioning system) combined with map information, e.g. stored in a local or remote database 208. The map data may comprise information relating to for example, type of road, number of traffic lanes and/or any static obstacles on the road. In addition, the control unit 204 may be configured to allow vehicle-to-vehicle communication (not shown), possibly for receiving vehicle environmental data from surrounding objects such as further vehicles.

Figure 3A:
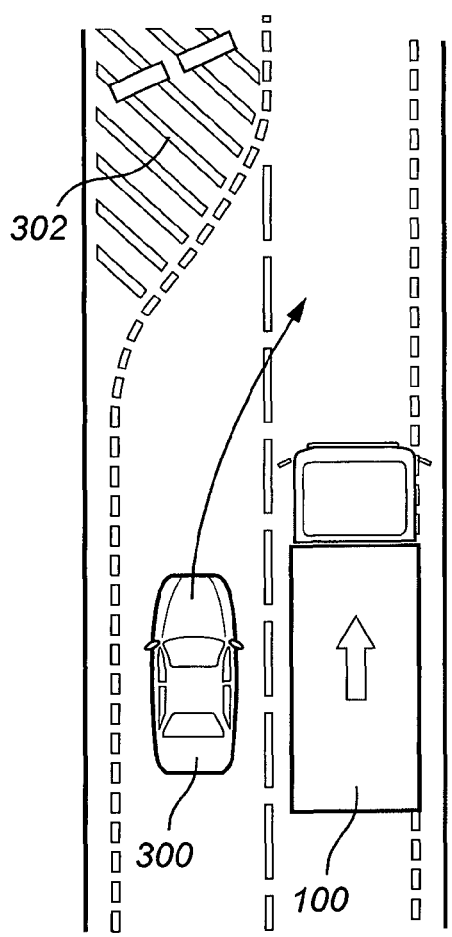
FIGS. 3 A-3C illustrate examples of general overtaking scenarios where the system according to the invention may be employed.

Turning now to FIGS. 3 A-3C illustrating examples of general overtaking scenarios where the system according to the invention may be employed. In the first scenario shown in FIG. 3A, the road is a so called two-to-one lane road, where the road transitions from two to one lane. Typically, this transition is provided using some sort of lane barrier, thus forming an obstacle in at least one of the lanes.

In the illustration provided in FIG. 3 A, the truck 100 is placed in the right lane (in relation to right hand traffic) and an overtaking vehicle 300 (i.e. a second vehicle) placed in the overtaking left lane is just in the process of initiating a maneuver for overtaking the truck 100. In the same lane as the second vehicle 300, a lane barrier 302 is provided for enforcing the road transitions from two to one lane. The lane barrier 302 forms an exemplary fixed obstacle, an obstacle that preferably should to be taken into account by the driver of the second vehicle 302 in planning to overtake of the truck 100.

In accordance with the invention, the truck 100 is as discussed above provided with the driver assistance system 200, comprising the plurality of sensors 202 for monitoring the surrounding of the truck 100. In the illustrated example of FIG. 3 A, the sensors 202 will locate the position of the obstacle/lane barrier 302 as well as identifying the initiating maneuver when the second vehicle 300 starts to overtake the truck 100. The system 200 may for example identifies such an initial overtaking maneuver by identify one of a plurality of behaviors made by the second vehicle 300. Such behavior for example includes identifying that the second vehicle 300 tags behind the truck 100 for a certain distance and then pulls out to perform an overtake action. Similarly, it may be possible to identify that the second vehicle 300 is approaching the truck 100 from a distance while accelerating and then performs an overtake action, or that the second vehicle 300 is approaching the truck with a constant velocity and performs an overtake action. All of the above exemplified behavior relates to an early indication of the fact that an overtaking maneuver has been initiated, i.e. that the driver of the second vehicle 300 has the intention to overtake the truck 100.

Once control unit 204 has processed the data provided by the sensors 202 and decided that an overtaking maneuver by the second vehicle 300 has been initiated, the surrounding ahead of the truck 100 is surveyed for possible problematic road condition, such as for example an obstacle. As discussed above, lane barrier 302 is located within the same lane as the second vehicle 300. The system 200 typically correlates the distance between to the lane barrier 302, the speed of the second vehicle 300 and the distance between the second vehicle 300 and the lane barrier 302, and the speed of the truck 100 and the distance between the lane barrier 302 and the truck 100. If it is determined, typically by determining a collision risk level, that the distance between the truck 100 and the lane barrier 302 is to short (in comparison to the time it would take for the overtaking manoeuver to complete) to allow the second vehicle 300 to safely continue the just initiated overtaking maneuver, the system 200 will typically generate a warning signal to be provided to the second vehicle 300, to the truck 100 or to any other vehicle within the surrounding of the truck 100. The warning signal includes at least one of a visual, acoustic or haptic warning signal. As such, the warning signal may be provided to the driver of the second vehicle 300 using external lights arranged with the truck 100, or in a more advanced implementation by vehicle-to-vehicle communication allowing the warning signal to be displayed within the user interface of the second vehicle 300. Similarly, the warning signal may be provided to the driver of the truck 100 at an internally arranged display element of the truck 100, or by introducing a vibration of the steering wheel of the truck 100.

Preferably, the warning signal will spark some sort of adjustment of the driving behavior of the driver of the second vehicle 300, or by the driver of the truck 100 such that the second vehicle 300 may safely finalize the overtaking maneuver before reaching the lane barrier 304, or by the second vehicle 300 slowing down and as such places itself tagging along behind the truck 100.

Alternatively, the request for an adjusted driving behavior may be forwarded for allowing an operational control of the truck 100 by automatically adjusting the speed and/or (slight) laterally adjusted position of the truck 100. Here, the breaking arrangement of the truck 100 may be activated for slowing down the truck 100, and/or automatic steering control may be activated for slightly moving the truck 100 a bit further to the right. Such a small lateral movement, if safe for the truck 100 based on the lane conditions on the right hand side of the truck (in relation to right hand traffic), may have a large impact on the general traffic condition and the safety for the second vehicle 300 in case the driver of the second vehicle 300 makes an erroneous judgment in regards to if the overtaking maneuver is safe to perform. The request for an automatically adjusted driving behavior may of course also be transmitted to the second vehicle 300 and implemented in a similar manner in relation to the automatic operational control of the second vehicle 300. The request for an automatically adjusted driving behavior may of course also be transmitted to any other/further vehicles within the surrounding of the truck 100 and implemented in a similar manner in relation to the automatic operational control of the truck 100 or second vehicle 300.

Figure 3B:
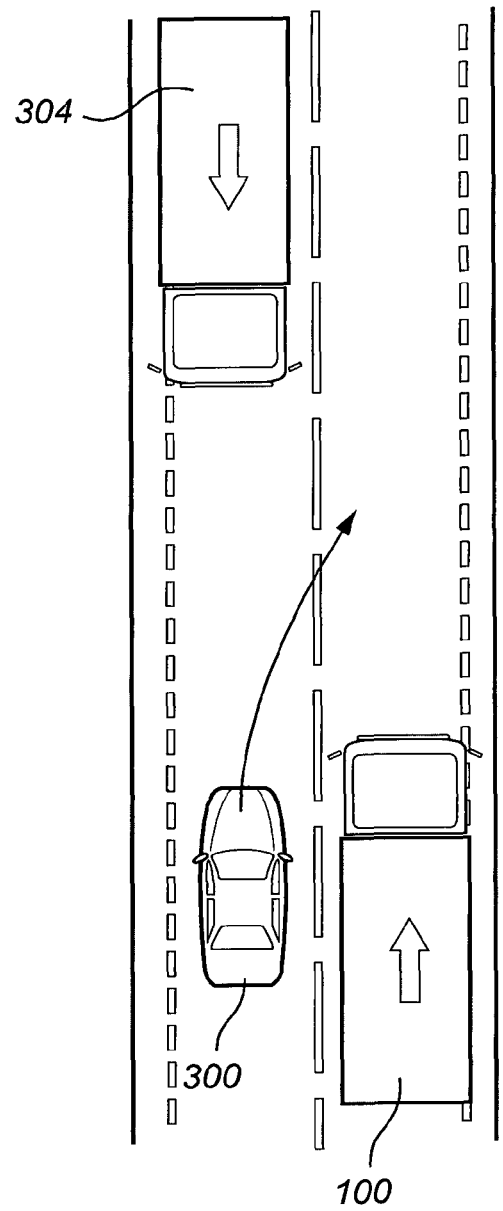
Figure 3C:
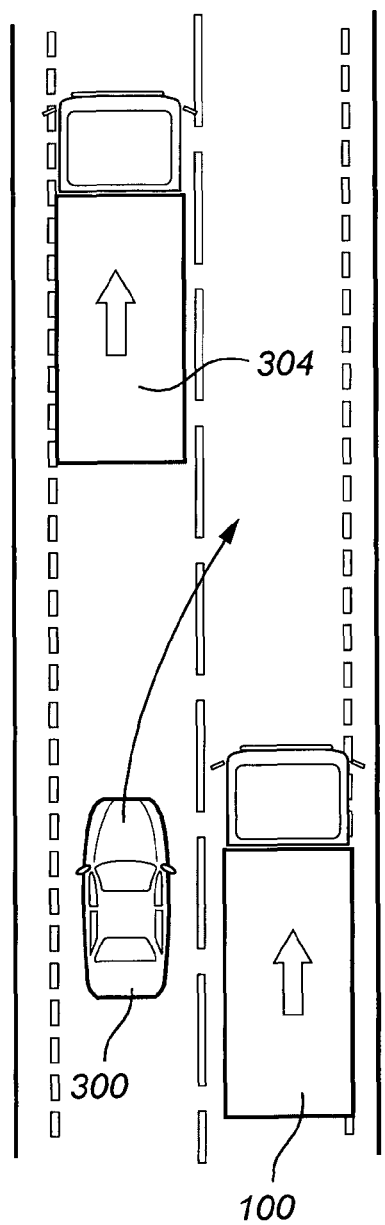

FIGS. 3B and 3C illustrates similar overtaking scenario as shown in FIG. 3A. However, in both of these situations the obstacle is non-static and in the illustrated embodiments the obstacles are shown as a further (third) vehicle 304 (i.e. being defined as other/further vehicle in the surrounding of the truck 100). In FIG. 3B the third vehicle 304 is moving in the opposite direction as compared to the truck 100 and the second vehicle 300. Accordingly, in such a scenario also the speed of the obstacle/third vehicle 304 (and reducing distance) must be taken into account when determining the collision risk level for the vehicles involved. In a similar manner as discussed above, request for an automatically adjusted driving behavior may be provided to any/all of the vehicles, e.g. to any/all of the truck 100, the second vehicle 300 and the third vehicle 304.

In FIG. 3C on the other hand the third vehicle 304 is travelling in the same direction as the truck 100 and the second vehicle 300, possibly having a reduced speed due to for example an upcoming road work or similar. Accordingly, once again the critical overtaking scenario may take place involving a high risk of collision. Similarly as discussed above, the request for an automatically adjusted driving behavior may of course also be transmitted to the third vehicle 304, typically by means of vehicle-to-vehicle communication, if available.

Figure 4:
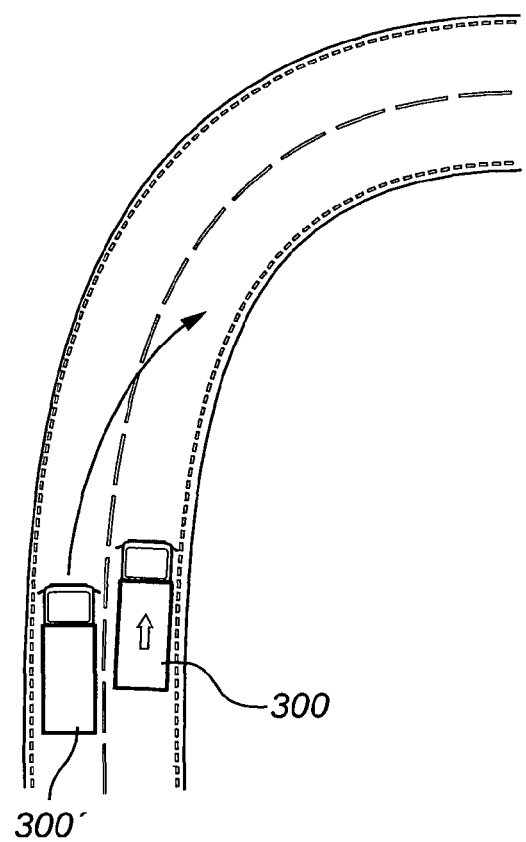
FIG. 4 shows a further overtaking scenario taking into account geographical features of the road.

In FIG. 4 another exemplary implementation of the invention is shown, where an alternative second vehicle 300' is set to initiate a maneuver to overtake the truck 100. In this scenario the truck 100 has collected information as to an upcoming road condition, specifically as to the geographical conditions of the road ahead of the truck 100. In the illustrated embodiment, rather than identifying an obstacle, the truck 100 has collected information as to a complicated curvy part of the road coming up somewhat ahead of the truck 100. The geographical condition may have been collected using information from the GPS 206 in conjunction with road related data stored in the database 208. Further information, separately or in combination, collected using the sensors 202 may be included for determining the upcoming road condition.

Similarly and as discussed above in relation to FIG. 3A-3C, the system 200 identifies a vehicle in the process of initiating an overtaking maneuver, in FIG. 4 the second vehicle 300'. Based on the speed of the second vehicle 300' and location in relation to the upcoming road condition, i.e. the complicated curvy road portion, the system 200 may determine that a high collision risk level is present, possibly due to the prediction that the second vehicle 300' when entering the curvy road portion may decide to quickly move in front of the truck 100 (e.g. by predicting a possible travel trajectory for the second vehicle 300'). In such a case, i.e. the collision risk level is higher than what may be desired, the system 200 may again warn the driver of the truck 100 and/or the driver of the second vehicle 300'. Also, or in case no reaction to the warning is identified, the system 200 may again automatically adjust the speed and/or the lateral position of one of or both of the truck 100 and the second vehicle 300'. Again, the request for an automatically adjusted driving behavior may of course also be transmitted to any other/further vehicles within the surrounding of the truck 100 and implemented in a similar manner in relation to the automatic operational control of the truck 100, second vehicle 300 and the third vehicle 304, typically by means of vehicle-to-vehicle communication, if available.

Figure 5:
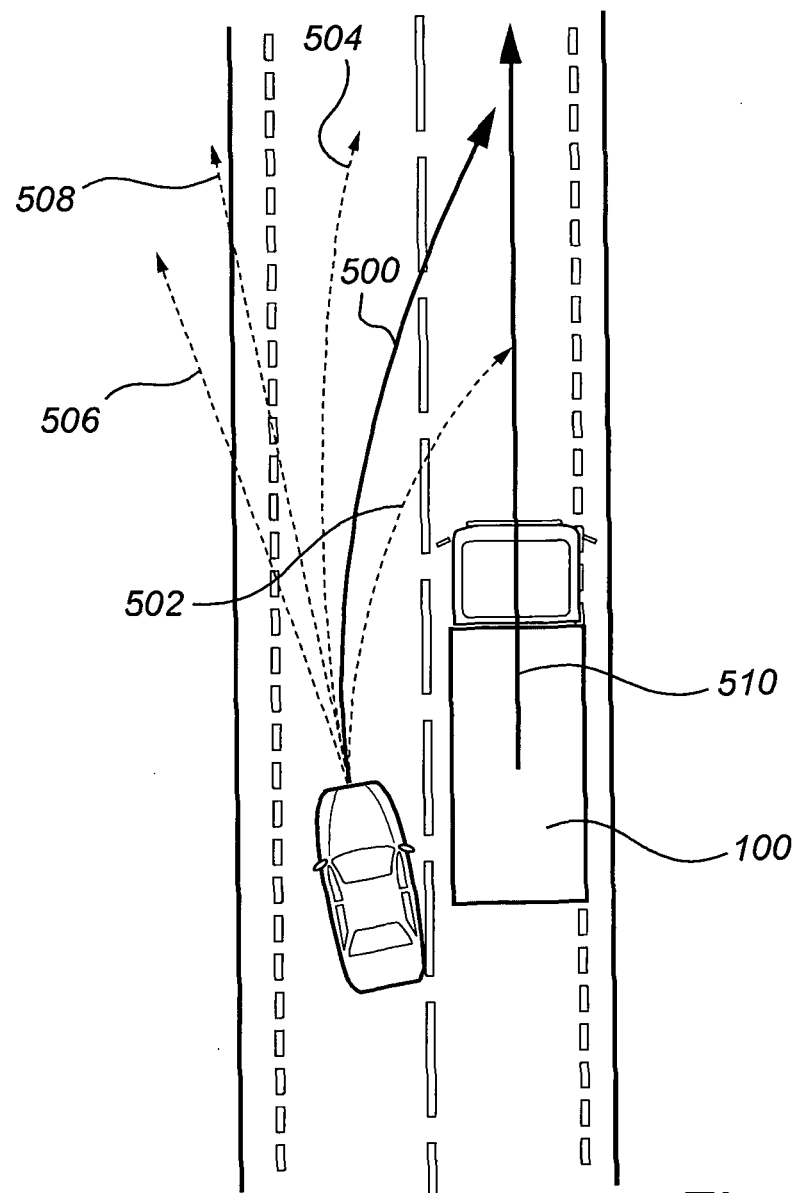
FIG. 5 disclose an example of the concept of possible travel trajectories for an overtaking vehicle.

Turning now to FIG. 5 illustrating a novel function, possible used in relation to identifying the second vehicle 300 performing the overtaking maneuver. Typically, this function will rely on the determination of a possible travel trajectory, 500-508, for the second vehicle 300 based on at least one of a position and speed of the second vehicle 300, and correlating this possible travel trajectory with further road geometry data. The function will typically make use of vehicle-to-vehicle communication for collecting information relating to the second vehicle, including for example location of the second vehicle, type of vehicle, speed, direction, yaw, etc.

The data that has been received by the sensors and from the other vehicles will be used to approximate a set of possible trajectories the second vehicle could follow. The possible trajectories may be used for further risk assessment, including determining if overlapping trajectories for different vehicles exists, possibly pointing towards unsafe conditions. The position uncertainty of the trajectory will be constrained to the lateral dimensions of the lane. It will also allow for the possibility to compare not only the positions predicted for the vehicles, but also the corresponding regions of uncertainty, being the final solution not affected by unrealistic areas which represent no risk since they belong to another lane, hence reducing the computing power required.

In the illustration provided in FIG. 5, five possible travel trajectories for the second vehicle 300 are shown. In addition, there is provided one further travel trajectory 510 for the truck 100. Out of the five possible travel trajectories 500-508 for the second vehicle 300, only the travel trajectory 500 is determined to be safe for the truck 100 and/or the second vehicle 300. In case the second vehicle 300 would travel according to the travel trajectory 500, the second vehicle 300 would be positioned "enough" far ahead of the truck 100 once the overtaking maneuver has been completed and the second vehicle 300 is safely positioned in front of the truck 100.

On the other hand, the remaining possible travel trajectories result in an overtaking maneuver ending too close in front of the truck 100 (trajectory 502), spend an undesirable long time (in comparison to a desired time) within the second lane (possibly being an opposite lane) (trajectory 504), or possibly overtaking in a direction not correlating to the direction of the road (trajectories 506 and 508). Accordingly, the possible travel trajectories 502-508 are determined to be unsafe and hence a warning may be provided to at least to the driver of the second vehicle 300.

The calculation of a possible travel trajectory may in an exemplary embodiment be implemented in the following manner:

1. Each surrounding vehicle will be transmitting its own GPS location to the truck 100. With this data an approximate (circular or elliptical) region could be defined in which the surrounding vehicle is most probable to currently lie in. With the help of visual/radar/lidar sensors, the region of the surrounding vehicle will be more accurate.

2. With the speed, acceleration and direction of travel of the surrounding vehicle, the truck 100 will approximate the time (T.T.I) it will take for the surrounding vehicle to reach the zone behind the truck where an overtaking manoeuver will be initiated. This distance may for example be within the range of 2-10 meters and would likely be the most common distance from which an overtaking manoeuver is started or ended.

3. With the value T.T.I, the system 200 will calculate the approximate position of the truck 100 with help from the digital maps (using the available formula Distance= initial_speed*t+0.5*acc.*timeA2). The system 200 will also calculate the positions of the oncoming vehicle(s) at time T.T.1.

4. The time taken to move out of lane, cover the length of the truck and move back into position (overtaking end zone) would be Time T.T.2. The calculations will be as follows:

a. Time taken to move out of lane=x*W*D*vl, where 'x' is a time constant chosen such that it represents an approx. value of time req. by vehicles to move out of lane into another one, 'W would be the weighting factor that would depend solely on the Weight or Inertia of the overtaking/second vehicle 300/300', 'D' would be based upon the Dimension of the overtaking vehicle second vehicle 300/300' and 'vl' the current velocity (or/and acceleration) of the overtaking/second vehicle 300/300'. 'W and 'D' can be combined to have 'Inertia' in its place for the calculations.

b. Time to cover the distance of the truck 100 can be solved from Distance=initial_speed*t+0.5*acc.*timeA2, where time is the only unknown. This time will be safely de-rated by a factor.

c. The time taken to move into the lane would again be calculated as x*W*D*vl.

5. Based upon these time calculations a trajectory of the (circular or elliptical) regions (of the overtaking/second vehicle 300/300') could be mapped showing the path of the vehicle w.r.t time. Since, the calculations are constrained to the lateral dimensions of the lane, the linear distance vs. time formula would suffice. The average acceleration would for the trajectory mapping would also be decided by the average speed of the overtaking/second vehicle 300/300' (over 'n' km) and the current acceleration of the overtaking/second vehicle 300/300'.

Once a possible trajectory has been calculated by the system 200, it may be for example be applied in relation to the general concept of the invention for reducing the collision risk for the truck 100, for the second vehicle 300/300' and/or for any other vehicle within the surrounding of the truck 100.

In determining the possible travel trajectory for the second vehicle, it may be possible to take further factors in to account, such as for example the average speed of the second vehicle in the past 'n' km will also be compared to the average speed of all the similar vehicles (based upon vehicle dimension, power, top speed) that have been captured by the system across the length of the road. This comparison will give an approximation of the "aggressiveness" and the "driver capabilities" of the overtaking vehicle. This helps in factoring in the causes of the driver ability to overtake in "close calls" and also the probability of the driver to ignore the warnings and move ahead with the manoeuver even during unsafe conditions.

Figure 6:
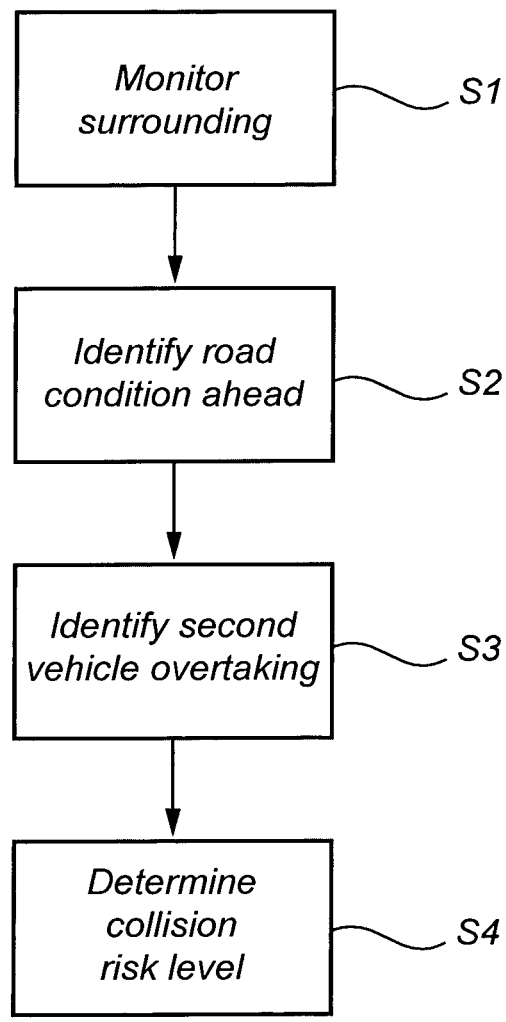
FIG. 6 illustrates a flow chart for operating a driver assistance system according to the invention.

In summary, with further reference to FIG. 6, the present invention relates to a method for driver assistance for a first vehicle such as a truck 100 or a car 100', the method comprising the steps of monitoring, SI, using sensors 202 provided with the truck 100 or car 100', a predefined area surrounding the truck 100 or car 100', identifying, S2, a road condition ahead such as a static or non static obstacle of the truck 100 or car 100' and within the predefined area, the road condition fulfilling a predetermined risk criteria, identifying, S3, a second vehicle 300/300' initiating a maneuver for overtaking the truck 100 or car 100', and determining, S4, a collision risk level for the truck/car 100/100' and/or second vehicle 300/300' during the overtaking maneuver.

By means of the invention, the surroundings of the truck 100 or car 100' is typically automatically monitored, for identifying one or a plurality of risky road conditions ahead of the truck 100 or car 100' as well as for identifying surrounding vehicles. By means of the invention, if it is identified that a surrounding vehicle (i.e. a second vehicle 300/300') is in the process of initiating an overtaking maneuver, such an initiated condition will be taken into account and correlated with the one or plurality of identified risky road conditions. The correlation between these two parameters, i.e. the risky road condition(s) and the just initiated overtaking maneuver by the second vehicle 300/300' will be used to determine collision risk level for the truck 100 or car 100' and/or second vehicle 300/300' at the time during which the second vehicle 300/300' in fact is performing the overtaking maneuver.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for driver assistance for a first vehicle, the method comprising:
   monitoring, using a detection arrangement provided with the first vehicle, a predefined area surrounding the first vehicle;
   identifying a road condition ahead of the first vehicle and within the predefined area, the road condition fulfilling a predetermined risk criteria;
   identifying a second vehicle initiating a maneuver for overtaking the first vehicle;
   determining a collision risk level for the first and/or second vehicle during the overtaking maneuver, and
   requesting, if the collision risk level is above the predetermined threshold, an automatic modification of a driving behavior of the first and/or second vehicle for reducing the collision risk level below the predetermined threshold,
   wherein identifying the second vehicle performing the overtaking maneuver comprises the steps of:
   calculating a possible travel trajectory for the second vehicle based on at least one of a position and speed of the second vehicle, and
   correlating road geometry data and the possible travel trajectory for the second vehicle for determining if the possible travel trajectory for the second vehicle gives the collision risk level to be above the predetermined threshold.

2. Method according to claim 1, further comprising generating, if the collision risk level is above a predetermined threshold, a warning signal to be provided to the second vehicle.

3. Method according to claim 1, wherein the warning signal includes at least one of a visual, acoustic or haptic warning signal.

4. Method according to claim 1, wherein the modification of the driving behavior comprises adjusting at least one of a speed and/or a lateral position of the first and/or the second vehicle.

5. Method according to claim 1, wherein identifying the road condition ahead of the first vehicle comprises identifying an obstacle ahead of the first vehicle.

6. Method according to claim 5, wherein the obstacle is arranged at a fixed location.

7. Method according to claim 4, further comprising the steps of:
   determining a distance and relative speed between the first vehicle and the obstacle,
   determining a distance and relative speed between a second vehicle and the obstacle, and
   calculating, based on the determined distances and speeds of the first and second vehicles in relation to the obstacle, the collision risk level for the first and/or the second vehicle.

8. Method according to claim 1, wherein monitoring the predefined area surrounding the first vehicle comprises determining road geometry data for a predetermined area surrounding the first vehicle.

9. Method according to claim 1, wherein identifying the second vehicle performing the overtaking maneuver comprises the steps of:
   calculating a possible travel trajectory for the second vehicle based on at least one of a position and speed of the second vehicle, and
   correlating the road geometry data and the possible travel trajectory for the second vehicle for determining if the possible travel trajectory has a collision risk level being above a predetermined threshold.

10. Method according to claim 1, further comprising collecting data relating to the characteristics of the second vehicle.

11. Method according to claim 1, wherein identifying the second vehicle performing the overtaking maneuver comprises at least one of:
    receiving, from the second vehicle, at least one of location related information, type of vehicle, speed, direction, yaw; and
    monitoring the second vehicle using at least one sensor arranged at the first vehicle.

12. Method according to claim 2, wherein the warning signal is provided to at least one fm1her vehicle located in the predetermined area surrounding the first vehicle.

13. A driver assistance system for a first vehicle, the driver assistance system comprising:
    a detection arrangement provided with the first vehicle and configured for monitoring a predefined area surrounding the first vehicle, and
    a control unit connected to the detection arrangement and adapted to receive a detection signal from the detection arrangement, the control unit configured to:
    identify a road condition ahead of the first vehicle and within the predefined area, the road condition fulfilling a predetermined risk criteria;
    detect a second vehicle travelling in the same direction as the first vehicle,
    identify, based on the detected second vehicle travelling in the same direction as the first vehicle, a maneuver initiated by the second vehicle for overtaking the first vehicle;
    determine a collision risk level for the first and/or second vehicle during the ove11ak:ing maneuver, and
    request, if the collision risk level is above the predetermined threshold, an automatic modification of a driving behavior of the first and/or second vehicle for reducing the collision risk level below the predetermined threshold, characterized in that the control unit is further configured to:
    calculate a possible travel trajectory for the second vehicle based on at, least one of a position and speed of the second vehicle, and
    correlate road geometry data and the possible travel trajectory for the second vehicle for determining if the possible travel trajectory for the second vehicle gives the collision risk level to be above the predetermined threshold.

14. Driver assistance system according to claim 13, wherein the detection arrangement comprises at least one of a radar unit, a lidar unit, a camera unit and a positioning unit and map data.

15. Driver assistance system according to claim 13, further comprising a communication unit for providing a warning signal to the second vehicle if the control unit determines that the collision risk level is above a predetermined threshold.

16. Driver assistance system according to claim 15, wherein the control unit is further configured for allowing communication between the control unit and a control arrangement for operating the first vehicle, the request for adjusting the driving behavior of the first vehicle transmitted to the control arrangement for adjusting at least one of a speed and/or a lateral position of the first vehicle.

17. A tangible non-transitory computer program product comprising a computer readable medium having stored thereon a computer program for controlling a driver assistance system for a first vehicle, the driver assistance system comprising a detection arrangement provided with the first vehicle and configured for monitoring a predefined area surrounding the first vehicle, and a control unit, wherein the computer program product comprises:
- code for monitoring a predefined area surrounding the first vehicle;
- code for identifying a road condition ahead of the first vehicle and within the predefined area, the road condition fulfilling a predetermined 1 isk criteria;
- code for identifying a second vehicle initiating a maneuver for overtaking the first vehicle;
- code for determining a collision risk level for the first and/or second vehicle during the overtaking maneuver;
- code for requesting, if the collision risk level is above the predetermined threshold, an automatic modification of a driving behavior of the first and/or second vehicle for reducing the collision risk level below the predetermined threshold;
- code for calculating a possible travel trajectory for the second vehicle based on at least one of a position and speed of the second vehicle, and
- code for correlating road geometry data and the possible travel trajectory for the second vehicle for determining if the possible travel trajectory for the second vehicle gives the collision risk level to be above the predetermined threshold.

* * * * *